(12) United States Patent  (10) Patent No.: US 6,711,258 B1
Sung  (45) Date of Patent: Mar. 23, 2004

(54) APPARATUS AND METHOD FOR CONTROLLING A VOLUME IN A DIGITAL TELEPHONE

(75) Inventor: Ho Sang Sung, Taejon (KR)

(73) Assignee: Electronics and Telecommunications Research Institute, Taejon (KR)

(*) Notice: Subject to any disclaimer, the term of this patent is extended or adjusted under 35 U.S.C. 154(b) by 0 days.

(21) Appl. No.: 09/494,084

(22) Filed: Jan. 28, 2000

(30) Foreign Application Priority Data

Dec. 3, 1999 (KR) ......................................... 1999-54900

(51) Int. Cl.⁷ .............................. H04M 1/00; H04M 9/00
(52) U.S. Cl. ............................ 379/390.01; 379/388.03; 379/388.05; 379/390.03; 370/289
(58) Field of Search ...................... 379/373.01, 373.03, 379/373.04, 374.01, 374.02, 375.01, 388.02, 388.03, 388.05, 390.03, 392.01, 404, 22.08, 406.05, 406.06; 370/286, 289

(56) References Cited

U.S. PATENT DOCUMENTS

| 3,809,811 | A | * | 5/1974 | Delisle et al. ................ 73/585 |
| 4,677,389 | A |   | 6/1987 | Op de Beek et al. ....... 330/129 |
| 4,926,459 | A | * | 5/1990 | Advani et al. ................ 379/52 |
| 5,195,131 | A | * | 3/1993 | Sano .................... 379/211.02 |
| 5,195,132 | A | * | 3/1993 | Bowker et al. ........ 379/406.07 |
| 5,280,525 | A | * | 1/1994 | Wesel ......................... 379/400 |
| 5,329,581 | A | * | 7/1994 | Friedes et al. ........... 379/93.14 |
| 5,388,152 | A | * | 2/1995 | Kawauchi ................... 379/157 |
| 5,388,185 | A | * | 2/1995 | Terry et al. ................. 704/205 |
| 5,481,599 | A | * | 1/1996 | MacAllister et al. ... 379/101.01 |
| 5,524,148 | A | * | 6/1996 | Allen et al. ................. 379/391 |
| 5,539,806 | A | * | 7/1996 | Allen et al. ................... 379/52 |
| 5,553,134 | A | * | 9/1996 | Allen et al. ............. 379/390.03 |
| 5,737,389 | A | * | 4/1998 | Allen ......................... 379/1.01 |
| 6,094,481 | A | * | 7/2000 | Deville et al. ......... 379/388.03 |

FOREIGN PATENT DOCUMENTS

| KR | 93-15512 | 7/1993 |
| KR | 97-24788 | 5/1997 |

* cited by examiner

Primary Examiner—Binh Tieu
(74) Attorney, Agent, or Firm—Seed IP Law Group PLLC

(57) ABSTRACT

The present invention relates to an apparatus and a method for volume control in digital telephones such as second generation mobile telephone terminals, third generation IMT 2000 image mobile telephone terminals, and ISDN (integrated service digital network) terminals. In particular, an apparatus and a method in accordance with an embodiment of the present invention measure background noise and adjust volume of received sound and/or ring signal accordingly. An embodiment of the present invention measures background noise before ringing ring signal and adjusts volume of ring signal. While communicating, the apparatus automatically adjusts volume of received sound in response to the measured background noise. A telephone terminal in accordance with an embodiment of the present invention includes voice/non-voice determination part, volume measurement part, and gain control part. The voice/non-voice determination part separates pure background noise from composite signal (voice+background noise). The volume measurement part measures amplitude of the background noise. The gain control part adjusts volume of received sound in response to the measured results. Signal processing is performed in digital domain and DSP is employed. Consequently, the digital telephone in accordance with an embodiment of the present invention is able to prevent noise pollution usually caused by loud ring signal and provide optimized volume for telephone users.

5 Claims, 6 Drawing Sheets

```
count1=count2=0;
for(i=0;i<FRAME;i++){
    if(flag==large){
        out1=out<<1;
        count1++;
        if(out1>32767){
            out1=32767;
            count2++;
            if(count2==2)
                flag=medium;
        }
        if(count1==5)
            count1=count2=0;
    }
}
```

APPARATUS AND METHOD FOR CONTROLLING A VOLUME IN A DIGITAL TELEPHONE

TECHNICAL FIELD

The present invention relates to an apparatus and a method for controlling a volume in digital telephones such as second generation mobile telephone terminals, third generation IMT 2000 image mobile telephone terminals, and ISDN (integrated service digital network) terminals. In particular, an apparatus and a method in accordance with an embodiment of the present invention measure background noise and adjust volume of received sound and/or ring signal accordingly.

BACKGROUND OF THE INVENTION

As telephones are popularized, they are used in various environments. Especially, as mobile telecommunication technology progresses, more and more people use mobile phones and telephone calls are made at any place at any time. However, large ring signal and loud voice for telephone sometimes bother people around the telephone user.

In such cases, usually telephone users increases voice tone or pitch because of small received sound, and the users forgets volume control of the ring signal because it is hard to adjust telephone ring signal rather than because they are rude. Therefore, if there are devices that are able to adjust telephone ring signal and volume of received sound automatically in response to various environments, the cases of inconvenience stated above will be definitely decreased.

Regarding this matter, Korea Patent Application No. 1991-025518 disclosed a technology adjusting volume of received sound automatically. The invention relates to an automatic level adjustment apparatus, which adjusts volume of received sound automatically in response to volume of transmitted sound. In this invention, since background noise doesn't perform any important role to adjust volume of received sound, volume of received sound may be varied on the basis of habit of telephone users.

Korea Patent Application No. 1995-035336 disclosed a telephone that adjusts volume of received sound automatically in response to background noise. The telephone is equipped with a microphone for collecting background noise and the collected background noise is utilized for adjusting volume of received sound automatically. Since the telephone measures background noise without discriminating between voice and non-voice, sometimes voice of telephone users are treated as noise, which may cause serious problem.

In addition, since additional circuitry is necessary to add such features to conventional digital telephones, the previous technologies causes cost increase and large sized telephones. Consequently, the previous technologies are not appropriate for state of the art digital telephones that pursue low cost, low power consumption, and low weight.

SUMMARY OF THE INVENTION

An apparatus and a method for volume control in digital telephone are provided. The digital telephone includes ring signal source, ring signal speaker, DSP (digital signal processor), and ADC (analog-digital converter). The ring signal source stores various sounds at transceiver and terminal. The ring signal speaker transmits ring signal provided by the ring signal source at in detecting ring signal. The DSP (digital signal processor) encodes and decodes input signal with voice codec. The ADC (analog-digital converter) converts analog signal into digital signal. The analog signal is provided from microphone of transceiver.

An apparatus and a method for volume control in digital telephone in accordance with an embodiment of the present invention includes background noise input part, input signal amplitude measurement part, and volume adjustment part. The background noise input part collects background noise and converts the noise into digital signals. The input signal amplitude measurement part measures amplitude of the background noise. The volume adjustment part adjusts ring signal amplitude provided from ring signal source in accordance with the amplitude of the background noise and generates the adjusted ring signal to ring signal speaker.

Preferably, the background noise input part includes a microphone of conventional transceiver and an ADC.

Preferably, the volume adjustment part compares sound pressure level of the measured background noise with unique minimum/maximum sound pressure of a digital telephone, adjusts ring signal volume on the basis of the minimum sound pressure if sound pressure level of the measured background noise is lower than unique minimum sound pressure of a digital telephone, adjusts ring signal volume on the basis of the maximum sound pressure if sound pressure level of the measured background noise is bigger than unique maximum sound pressure of a digital telephone, adjusts ring signal volume in proportion to the measured sound pressure level of the measured background noise if sound pressure level of the measured background noise is between the unique minimum sound pressure and the unique maximum sound pressure of a digital telephone.

An apparatus for volume control in digital telephone is provided. The digital telephone includes ring signal source, ring signal speaker, DSP (digital signal processor), ADC (analog-digital converter), and DAC (digital-analog converter). The ring signal source stores various sounds at transceiver and terminal. The ring signal speaker transmits ring signal provided by the ring signal source at in detecting ring signal. The DSP (digital signal processor) encodes and decodes input signal with voice codec. The ADC (analog-digital converter) converts analog signal into digital signal. The DAC (digital-analog converter) converts digital signal into analog signal. The analog signal is provided from microphone of transceiver and the digital signal is provided from voice codec.

An apparatus for volume control in digital telephone in accordance with an embodiment of the present invention includes background noise input part, voice/non-voice discrimination part, input signal amplitude measurement part, and volume control part. The background noise input part collects background noise and converts the noise into digital signals. The voice/non-voice discrimination part receives the collected background noise, discriminates between voice and non-voice, and isolates pure noise. The input signal amplitude measurement part measures amplitude of the isolated pure noise. The volume control part adjusts volume of received sound in accordance with the measured amplitude of the isolated pure noise and provides to speaker at receiver. The received sound is provided from the speech codec.

Preferably, the background noise input part includes a microphone of conventional transceiver and an ADC.

Preferably, the volume control part is equipped with ring signal adjustment capability. The ring signal adjustment capability adjusts ring signal in accordance with the measured amplitude of the isolated pure noise and provides to ring signal speaker.

A method for volume control in digital telephone with DSP (digital signal processor) is provided. A method for volume control in digital telephone with DSP (digital signal processor) in accordance with an embodiment of the present invention includes ring signal adjustment step and received sound adjustment step. The ring signal adjustment step is for setting up a call, measuring background noise, and adjusting amplitude of ring signal in accordance with the measured background noise when a phone call is received at standby state. The received sound adjustment step is for collecting background noise from call-start to call-end, measuring amplitude of the background noise, determining level of received sound on the basis of the measured amplitude of the background noise, and adjusting amplitude of received sound.

Preferably, the amplitude of ring signal is determined by following steps. A step is for collecting background noise using microphone at a transceiver. A step is for converting the collected noise into digital signal. A step is for measuring sound pressure level of the digital signal. A step is for comparing sound pressure level of the measured background noise with unique minimum/maximum sound pressure of a digital telephone. A step is for adjusting ring signal volume on the basis of the minimum sound pressure if sound pressure level of the measured background noise is lower than unique minimum sound pressure of a digital telephone. A step is for adjusting ring signal volume on the basis of the maximum sound pressure if sound pressure level of the measured background noise is bigger than unique maximum sound pressure of a digital telephone. A step is for adjusting ring signal volume in proportion to the measured sound pressure level of the measured background noise if sound pressure level of the measured background noise is between the unique minimum sound pressure and the unique maximum sound pressure of a digital telephone.

Preferably, the received sound adjustment step includes following steps. A step is for converting the collected noise into digital signal. A step is for isolating pure noise from transmitting signal by discriminating between voice and non-voice from in the digital signal.

Preferably, the step for determining level of received sound and adjusting amplitude of received sound in the received sound adjustment step employ 10~30 ms unit as a basic data processing unit.

Preferably, the level of received sound in the received sound adjustment step comprises several stages and is determined by comparing sound pressure of the measured background noise with reference sound pressures of the stages.

Preferably, the step for determining the level of received sound sets the determined level as level for current frame for preventing errors in discriminating between voice and non-voice and frequent change of levels in response to accidental noise if same levels are continued for certain number of frames and level of current frame is changed into different level.

Preferably, the step for determining the level of received sound maintains the level of received sound with input level if the determined level of received sound is higher and lower than the level of previous frame and thereby overflow or underflow is caused in increasing or decreasing volume of received sound.

A method implemented in a computer system for volume control in digital telephone with DSP (digital signal processor) is provided. A method implemented in a computer system for volume control in digital telephone with DSP (digital signal processor) in accordance with an embodiment of the present invention includes ring signal adjustment step and received sound adjustment step.

The ring signal adjustment step includes following steps. A step is for setting up a call. A step is for collecting background noise using microphone at a microphone of a transceiver. A step is for converting the collected noise into digital signal. A step is for measuring sound pressure level of the digital signal. A step is for comparing sound pressure level of the measured background noise with unique minimum/maximum sound pressure of a digital telephone. A step is for adjusting ring signal volume on the basis of the minimum sound pressure if sound pressure level of the measured background noise is lower than unique minimum sound pressure of a digital telephone. A step is for adjusting ring signal volume on the basis of the maximum sound pressure if sound pressure level of the measured background noise is bigger than unique maximum sound pressure of a digital telephone. A step is for adjusting ring signal volume in proportion to the measured sound pressure level of the measured background noise if sound pressure level of the measured background noise is between the unique minimum sound pressure and the unique maximum sound pressure of a digital telephone The received sound adjustment step includes following steps. A step is for collecting background noise from call-start to call-end. A step is for converting the collected noise into digital signal. A step is for isolating pure noise from transmitting signal by discriminating between voice and non-voice from in the digital signal. A step is for measuring sound pressure level of the pure noise. A step is for determining level of received sound on the basis of the measured sound pressure of the background noise. A step is for adjusting amplitude of the received sound.

BRIEF DESCRIPTION OF THE DRAWINGS

The embodiments of the present invention will be explained with reference to the accompanying drawings, in which.

DETAILED DESCRIPTION OF THE INVENTION

Figure 1:
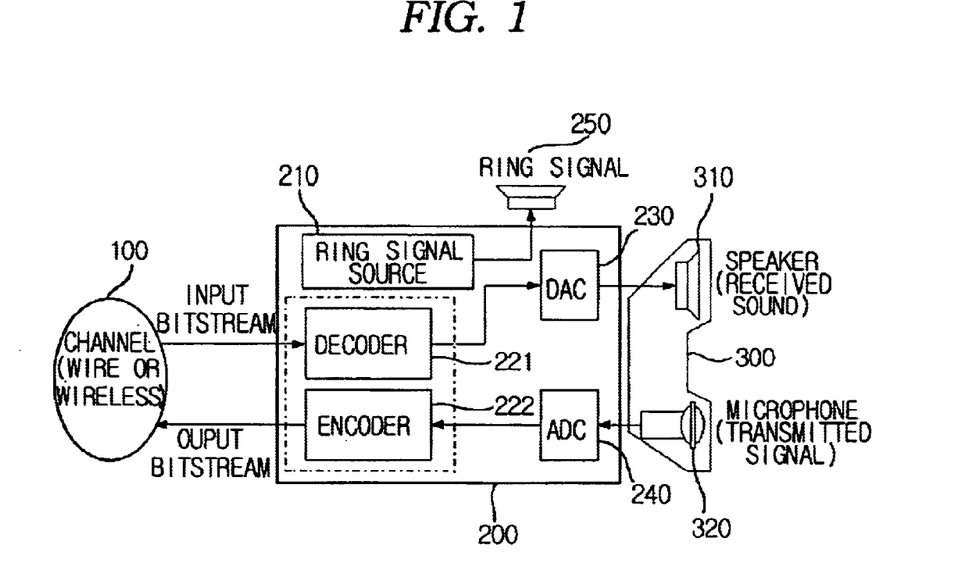
FIG. 1 is a diagram illustrating structure of a conventional digital telephone.

FIG. 1 is a diagram illustrating structure of a conventional digital telephone.

As shown in FIG. 1, a digital telephone terminal includes a terminal main body 200 and a transceiver 300. The terminal main body includes a ring signal source 210, a ring signal speaker 250, a DSP (digital signal processor) 220, a DAC (digital to analog converter) 230, and an ADC (analog to digital converter). The DSP 220 includes a voice codec and the voice codec includes an encoder 222 and a decoder 221.

The ring signal source stores various sounds, that is, bell sounds. The ring signal speaker 250 transmits ring signal provided by the ring signal source at in detecting ring signal. The DSP (digital signal processor) 220 encodes and decodes input signal with voice codec. The decoder 221 decodes bitstream supplied from wire or wireless channel 100. The encoder 222 generates bitstream to wire or wireless channel 100. The ADC (analog-digital converter) converts analog voice signal into digital signal. The DAC (digital-analog converter) converts digital signal into analog voice signal. The analog signal is provided from microphone of transceiver and the digital signal is provided from voice codec.

Figure 2:
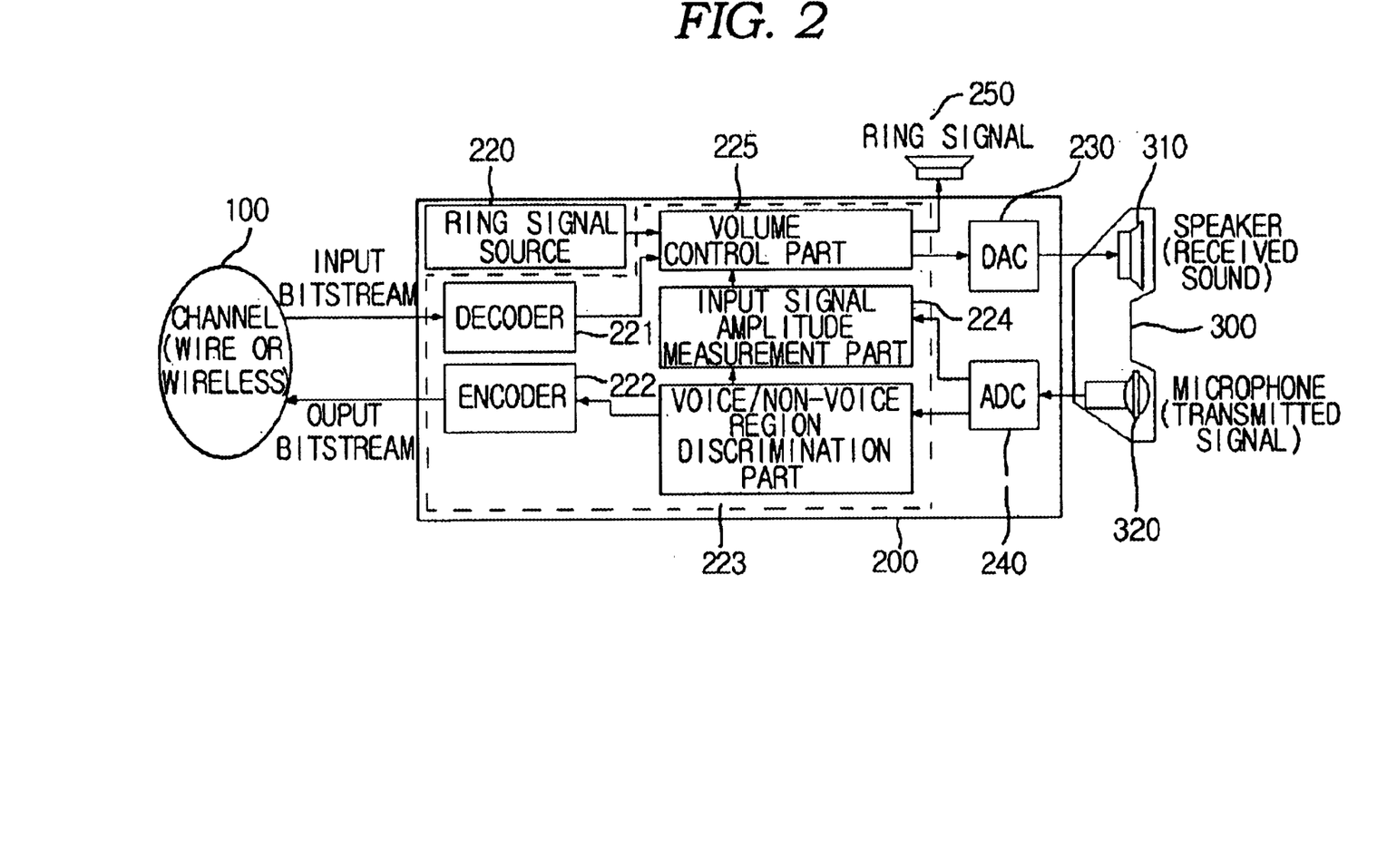
FIG. 2 is a diagram illustrating structure of a digital telephone in accordance with an embodiment of the present invention.

In such conventional digital telephone terminals, the apparatus in accordance with an embodiment of the present invention measures background noise and adjust volume of received sound and/or ring signal accordingly. The apparatus is implemented as a function block in the DSP 220 as shown in FIG. 2. FIG. 2 is a diagram illustrating structure of a digital telephone in accordance with an embodiment of the present invention. An apparatus for volume control in digital telephone in accordance with an embodiment of the present invention includes voice/non-voice discrimination part 223, input signal amplitude measurement part 224, and volume control part 225. The microphone at the transmitter collects background noise and digitizes the collected noise. The voice/non-voice discrimination part receives the collected background noise, discriminates between voice and non-voice, and isolates pure noise. The input signal amplitude measurement part measures amplitude of the isolated pure noise. The volume control part adjusts volume of received sound in accordance with the measured amplitude of the isolated pure noise and provides to speaker at receiver. The received sound is provided from the voice codec.

The ring signal adjustment device in accordance with an embodiment of the present invention doesn't include the voice/non-voice discrimination part since it is used when a call is arrived and then voice of an user is not included in the signal.

The microphone at the transmitter is used as an background noise input part 320 and sound pressure level of the input signal is measured at the input signal amplitude measurement part 224. The volume control part 225 adjusts ring signal provided from the ring signal source 210 and generates the adjusted sound to the ring signal speaker 250.

After a call has been set up, the received sound adjustment device in accordance with an embodiment of the present invention employs voice/non-voice discrimination part 223 to discriminate between voice of the user and pure noise. Regarding pure noise, the input signal amplitude measurement part 224 measures sound pressure level and the volume control part 225 adjusts volume of the received sound on the basis of the measured sound pressure level. The speaker 310 at the receiver generates the adjusted signal.

Figure 3:
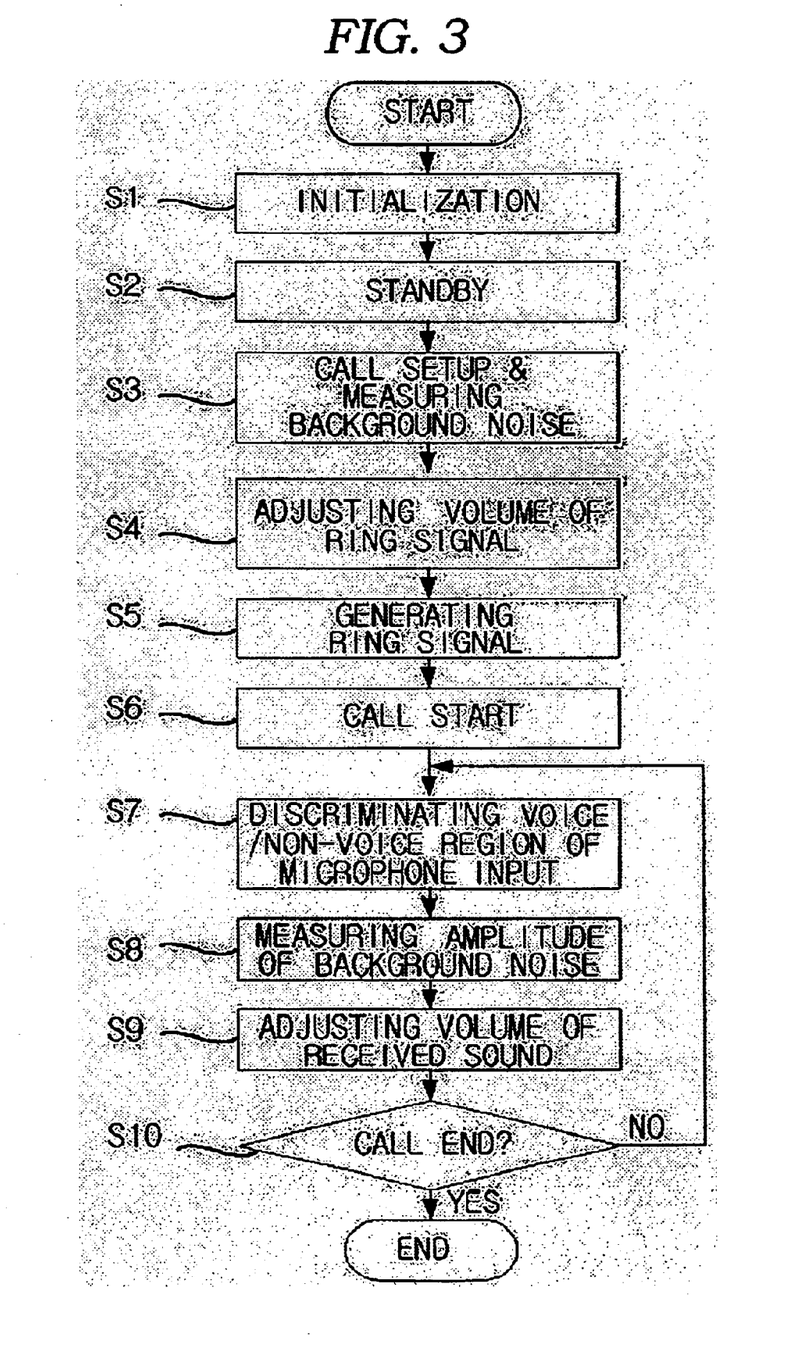
FIG. 3 is a flow diagram illustrating a ring signal/volume of received sound control method in accordance with an embodiment of the present invention.

FIG. 3 is a flow diagram illustrating a ring signal/volume of received sound control method in accordance with an embodiment of the present invention.

As shown in FIG. 3, initialization S1 is performed and then a telephone terminal is in standby state S2. When a call is arriver, call setup process is performed. When the call setup process is completed, the telephone terminal generates ring signal.

The method in accordance with an embodiment of the present invention measures background noise at step S3 after call setup process. The timing for obtaining background noise is described in detail at FIG. 5. The background noise supplied from the microphone 320 at the transmitter is converted into digital signal by ADC 240 and sound pressure level of the digital signal is measured at the input signal amplitude measurement part 224.

In measuring sound pressure level, an average value of n frames is used. In each frame, sound pressure level is measured in reference to small sound. Input signal is sampled at 8 kHz and quantized with 16 bit per sample. The range of the value is between −32768 and 32767. Following equation 1 illustrates a mathematical equation deriving sound pressure level from input signal.

$$spl = 20\log(A/base) \quad \text{[Equation 1]}$$

In equation 1, base means amplitude of the reference sound. Since small sound is used as the reference sound, base becomes 1 with 16 bit sample. A in equation 1 is amplitude of the digitized input signal and the biggest value is 32768. Regarding each sample, measured sound pressure has a value between 0 and 90 and therefore sound pressure that is actually generated means average value of the frame.

The volume control part 225 adjusts volume of ring signal in accordance with the measured sound pressure.

Figure 6:
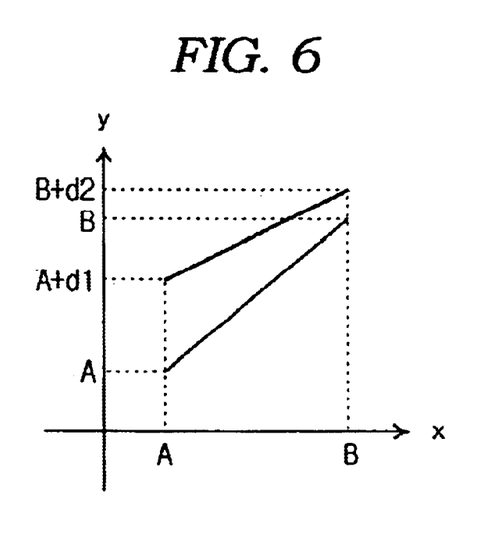
FIG. 6 is a graph illustrating ring signal pressure level.

FIG. 6 is a graph illustrating ring signal pressure level. In FIG. 6, let's supposed that (A+a) is minimum sound pressure level and (B+b) is maximum sound pressure level in accordance with ring signal of the telephone. If the sound pressure level of the measured background noise is smaller than or equal to A, ring signal with (A+a) amplitude is generated. If the sound pressure level of the measured background noise is larger than or equal to B, ring signal with (B+b) amplitude is generated. If the sound pressure level of the measured background noise is bigger than A yet smaller than B, amplitude of ring signal is generated on the basis of the following equation 2.

$$y = \left(\frac{B - A + b - a}{B - A}\right)x + \left(\frac{aB - bA}{B - A}\right), \quad \text{[Equation 2]}$$

$$A \leq x \leq B, 5 \leq b \leq (a - 5) \leq 15$$

A, B: determined from unique ring signal amplitude of a telephone a, b: constants x: sound pressure of the measured background noise y: volume of output ring signal Since sound pressure is log scale based, ring signal that is little bigger than the background noise cannot give discrimination capability to listeners. Therefore, in case of small sound pressure level, higher priority is given to ring signal and lower priority is given to big sound signal. Consequently, listeners feel similar sound pressure difference at large.

At step S7 through step S10, input signal generated from a microphone is analyzed from call-start to call-end. As a result, received sound of the telephone is adjusted to be a larger value in an environment where background noise is big and received sound of the telephone is adjusted to be a smaller value in an environment where background noise is small.

The microphone 320 installed at the transmitter is used for collecting background noise. However, a microphone for onhook call may be used for noise collection. Therefore, additional microphone is not needed.

Input signal provided from the microphone of the telephone sometime includes small amount of background noise and sometimes background noise is mixed with voice signal of a user. In case that voice signal is not included, simply background noise is measured. However, in case that voice signal is mixed with background noise, voice signal may be misunderstood as background noise and it may cause wrong result. Therefore, in order to cover cases in which voice signal is provided with background noise, the voice/non-voice discrimination part 223 performs voice/non-voice detection algorithm.

Several methods have been proposed in the area of voice/non-voice detection algorithm. In an embodiment of the present invention, signal is sampled in 8 kHz in digital domain and quantized in 16 bit/sample. Voice signal and background noise are discriminated by a voice/non-voice detection algorithm at step S7.

Following technical reports contain information regarding voice/non-voice detection algorithm and an embodiment of the present invention employs the third method proposed by Jung et al.

[1]ITU-T Recommendation G.723.1, 'Dual rate speech coder for multimedia communications transmitting at 5.3 and 6.3 kbit/s,' March 1996

[2]U.S. Philips Corporation, 'Method and device for voice activity detection and a communication device,' Patent No. 5963901, Oct. 1999.

[3] Woosung Jung, Sangwon Kang, Hosang Sung, Insung Lee, Jaewon Kim, and Songin Choi, "Design of a variable rate speech codec for the W-CDMA system," KSCSP'98, Vol.15, No.1, pp.142–147.

Figure 5:
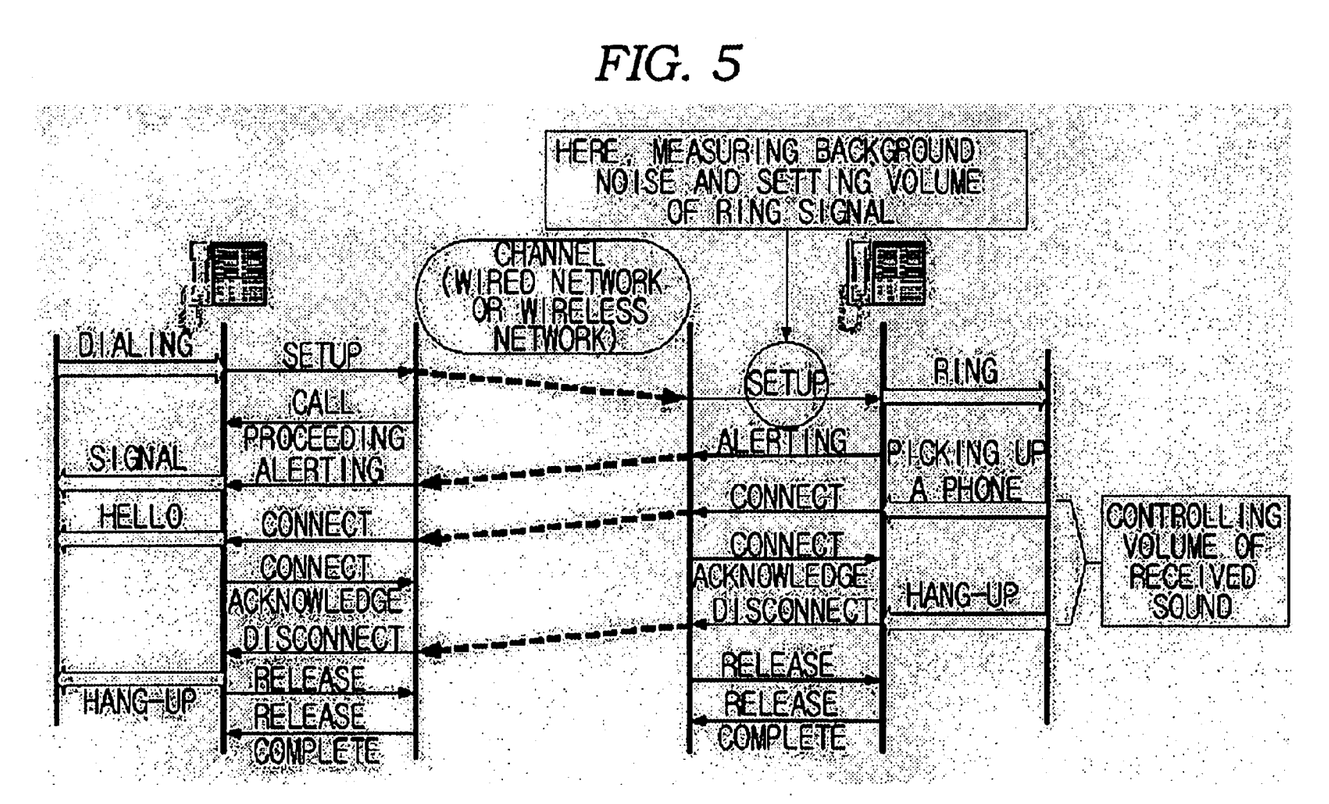
FIG. 5 is a diagram illustrating call processing at ISDN (integrated service digital network)

The input signal amplitude measurement part 224 measures sound pressure for the measured pure background noise at step S8. After sound pressure is measured, volume of the received sound is optimized through level selection step, volume adjustment step, and hangover application step at step S9. As shown in FIG. 5, this process is continued from call-start to call-end.

In adjusting volume of received sound through level selection step and volume adjustment step, basic data processing unit is 10~30 ms. Minimum for obtaining vocal data is 10 ms.

Maximum size is 30 ms since frame size of codec used in digital telephones is smaller than 30 ms. Therefore, actual data processing unit for system implementation is represented as d and it is named frame size. All level selection is performed with d.

Figure 4:
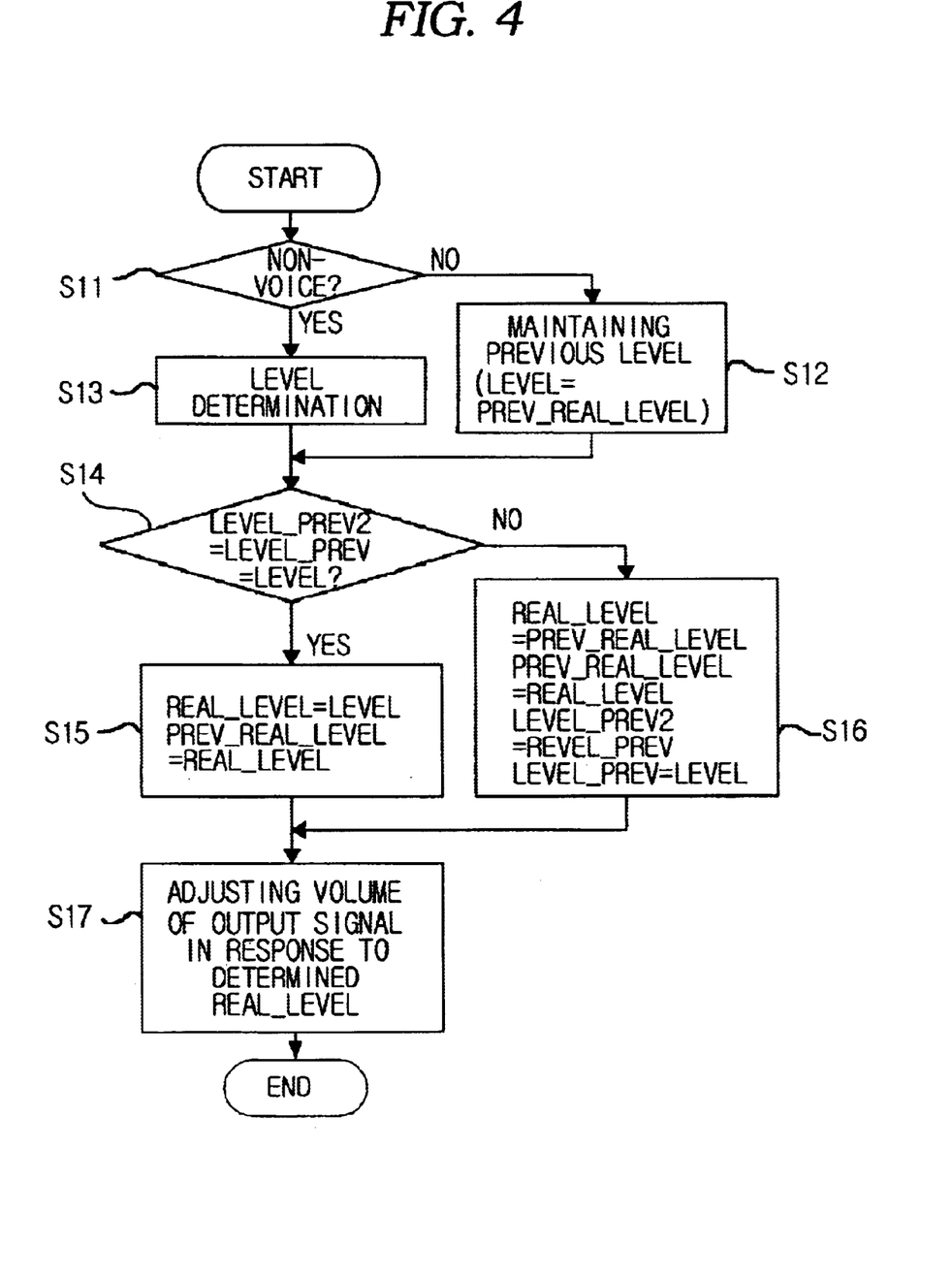
FIG. 4 is a flow diagram illustrating the received sound volume adjustment step shown in FIG. 3 in detail.

FIG. 4 is a flow diagram illustrating the received sound volume adjustment step shown in FIG. 3 in detail.

In case that a frame for obtaining sound pressure level is determined as voice of a user and background noise cannot be measured, level of the previous frame is maintained at step S11 and S12.

Level selection is composed of multiple stages, for example, three stages and a level is determined by comparing level pressure of non-voice part with reference sound pressure of each stage at step S13.

For example, received sound may be divided into three levels, "small", "medium", and "large". Once an average sound pressure is determined in accordance with the equation 1, level selection in detail may be implemented as follows. If average sound pressure is bigger than 60 dB, output level is set as "large". Otherwise, all levels are set as "medium". This standard may be modified by listening experiment. If received sound is determined as "medium", volume control part 225 passes the signal as the decoder 221 generates.

Now, hangover application process from step S14 to step S16 is described.

A reason for hangover application is that users may complain volume of received sound when voice/non-voice discrimination is temporarily failed and levels are continuously changed in response to accidental noise.

Hangover is applied only if levels are changed. When same level is determined for a certain number of frames, a level determined at step 13 is set as current frame's level at step S15.

For example, when level is changed from "medium" to "large" or "small", changed from "large" or "small" to "medium", or changed from "small" to "large" or "medium" and same level is determined for a certain amount of time, for example, 200~500 ms, the determined level is set as current frame's level. 200~500 ms means 7~17 frames for ITU-T G.723.1 voice codec and therefore same level has to be determined for 7~17 frames to set the determined level as current frame's level.

In the flow diagram of FIG. 4, a case in which same level is determined for three frames and the determined level is set as current frame's level is illustrated.

If same level is not determined for certain frames or an intermediate frame is determined as a voice frame, count is reset and the value of previous level is maintained.

Using the determined current level, volume of received sound is adjusted at step S17.

In adjusting volume of received sound, if underflow or overflow is occurred for a certain number of samples, output of the decoder 221 is directly generated. That is, volume of received sound is not controlled.

For example, if volume of received sound is determined "small", signal generated at the decoder 221 is shifted 1 bit to right direction and therefore amplitude of output voice is reduced by half. Likewise, if volume of received sound is determined "large", signal generated at the decoder 221 is shifted 1 bit to left direction and therefore amplitude of output voice is doubled. If volume of received sound is determined "medium", signal generated at the decoder 221 is directly provided.

At "large" level, if an overflow is caused at output voice of the volume control part 225, the level is returned to "medium". This level return occurs when overflows are happened for certain number of samples, for example, 2 samples out of 5 samples. The reason for this is that impulse may be caused by noise.

Figure 7:
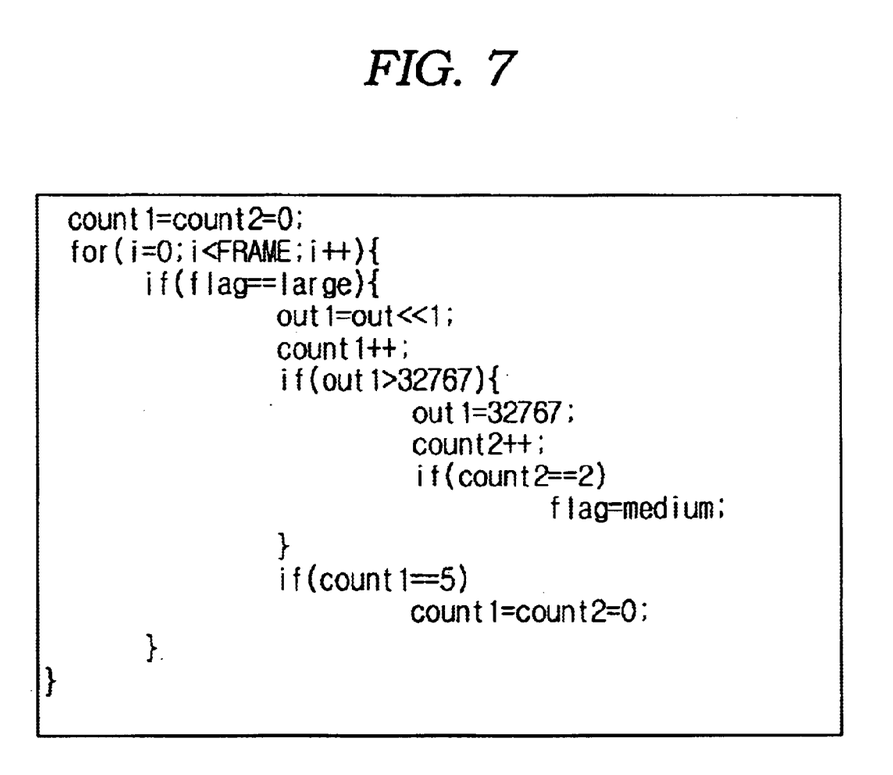
FIG. 7 is a program list written in C language illustrating level selection step and volume adjustment step if received sound level is determined "large".

FIG. 7 is a program list written in C language illustrating level selection step and volume adjustment step if received sound level is determined "large". At "small" level, if an underflow is caused at output voice of the volume control part 225, the level is returned to "medium". Underflow means the case in which amplitude of the sample is below 10 and this level return occurs when underflows are happened for certain number of samples, for example, 2 samples out of 5 samples. Regardless of frame size, if happened in a frame, these two level returns restore the level at the moment.

As described above, an embodiment of the present invention automatically controls ring signal and/or volume of received sound in response to background noise. Therefore, it increases convenience of users and causes effect of adding values.

Also, since an embodiment of the present invention utilizes features already equipped for conventional digital telephones without adding any additional hardware, it is competitive in terms of cost and may be applied to any type of digital telephone.

Although representative embodiments of the present invention have been disclosed for illustrative purpose, those who are skilled in the art will appreciate that various modifications, additions and substitutions are possible without departing from the scope and spirit of the present invention as defined in the accompanying claims.

I claim:

1. A method for controlling a volume in a digital telephone with a DSP (digital signal processor), comprising:

a ring signal adjustment step for setting up a call, measuring a noise, and adjusting an amplitude of a ring signal in accordance with the measured noise when a phone call is received at a standby state; and a received sound adjustment step for collecting the noise from a call-start to a call-end, measuring the amplitude of the noise, determining a level of a received sound on the basis of the measured amplitude of the noise, and adjusting an amplitude of received sound, wherein the level of received sound in the received sound adjustment step comprises several stages and is determined by comparing the sound pressure of the measured noise with reference to sound pressures of the stages, and wherein to prevent frequent change of levels due to errors in discriminating between a voice and a non-voice and an accidental noise, the determined level of the received sound is set as a level for a current frame when same levels are continued for a certain number of frames.

2. The method for controlling the volume of claim 1, wherein the amplitude of the ring signal is determined by steps of:

collecting the noise using a microphone of a transceiver;

converting the collected noise into a digital signal;

measuring a sound pressure level of the digital signal;

comparing the sound pressure level of the measured noise with an unique minimum/maximum sound pressure of the digital telephone;

adjusting a ring signal volume on the basis of the minimum sound pressure if the sound pressure level of the measured noise is lower than the unique minimum sound pressure of the digital telephone;

adjusting the ring signal volume on the basis of the maximum sound pressure if the sound pressure level of the measured noise is greater than the unique maximum sound pressure of the digital telephone; and adjusting the ring signal volume in proportion to the measured sound pressure level of the measured noise if the sound pressure level of the measured noise is between the unique minimum sound pressure and the unique maximum sound pressure of the digital telephone.

3. The method for controlling the volume of claim 1, wherein the received sound adjustment step comprises the steps of:

converting the collected noise into the digital signal; and isolating a pure noise from transmitting a signal by discriminating between a voice and a non-voice from in the digital signal.

4. The method for controlling the volume of claim 1, wherein the received sound adjustment step employ 10~30 ms unit as a basic data processing unit.

5. The method for controlling the volume of claim 1, wherein the step for determining the level of received sound maintains the level of the received sound with an input level if the determined level of the received sound is higher or lower than the level of previous frame and thereby overflow or underflow is caused in increasing or decreasing volume of the received sound.

* * * * *